United States Patent [19]

White

[11] Patent Number: 4,486,134
[45] Date of Patent: Dec. 4, 1984

[54] ADJUSTABLE CONNECTOR ASSEMBLY

[76] Inventor: Timothy T. White, P.O. Box 28181, San Jose, Calif. 95151

[21] Appl. No.: 379,128

[22] Filed: May 17, 1982

[51] Int. Cl.³ .............................................. F16B 25/00
[52] U.S. Cl. .................... 411/103; 411/178; 411/107; 411/526; 411/383; 29/526 R
[58] Field of Search .............. 411/103, 105, 178, 180, 411/349, 350, 337, 370–372, 383, 396, 533, 536, 537, 546, 517, 427; 403/3, 4, 21; 29/526

[56] References Cited

U.S. PATENT DOCUMENTS

| 1,275,944 | 8/1918 | Lacerda | 411/370 |
| 1,285,245 | 11/1918 | Lacerda et al. | 411/370 |
| 2,390,173 | 12/1945 | Richey | 411/105 |
| 2,639,179 | 5/1953 | Phelps | 411/178 |
| 2,831,520 | 4/1958 | Clarke | 411/349 |
| 3,230,994 | 1/1966 | Rosan | 411/178 |
| 3,502,130 | 3/1970 | Gulistan | 411/371 |
| 3,667,338 | 6/1972 | Johansson | 411/427 |
| 4,017,267 | 4/1977 | Hawley | 29/526 |

FOREIGN PATENT DOCUMENTS 262504 12/1949 Switzerland ..................... 411/178

Primary Examiner—Gary L. Smith
Assistant Examiner—Neill Wilson
Attorney, Agent, or Firm—John J. Leavitt

[57] ABSTRACT

Presented is an adjustable connector assembly for utilization in adjustably connecting two juxtaposed members which, for proper fit, must be secured to one another and must be capable of being moved relative to each other to accomplish a proper fit. An example of such a situation is provided by a door frame which must be attached to supporting structural members and which must be plumb even though the supporting structural members to which the door frame is secured are not plumb. The adjustable connector assembly includes a first connector secured to one of the juxtaposed members and a second connector rotatably mounted on the first connector and also connected to the other juxtaposed member.

6 Claims, 11 Drawing Figures

ADJUSTABLE CONNECTOR ASSEMBLY

BACKGROUND OF THE INVENTION

1. Field of the Invention

This invention relates to connectors and particularly to adjustable connectors adapted to secure together and to permit adjustment of two juxtaposed structural members.

2. Description of the Prior Art

It is believed that the prior art related to this invention may be found in Class 52, sub-class 217. A search through the class and sub-class noted has revealed the existence of U.S. Pat. Nos. 381,329; 1,750,921; 2,075,714; 3,533,891; 3,668,966 and 3,859,764. Of these patents, U.S. Pat. Nos. 381,329; 1,750,921 and 3,859,764 appear to be the most pertinent insofar as the invention is concerned as it relates to the use of the invention to plumb a door frame.

It frequently happens that when two juxtaposed members are fastened together to achieve a desired fit, one or the other of the members does not fit properly and must be adjusted in relation to the associated member in order to achieve a proper fit. Such a condition exists in the installation of door frames in wall openings, where the door frame must be secured between appropriate wall studs which may or may not be plumb. In this particular environment, it has been the custom to insert shims in the form of roof shingle portion in the space between the door frame and the associated wall stud. Finishing nails are then driven through the door frame and shingles to anchor the shingle shims and door frame in position, the hope being that they do not shift position, and cause the door frame to lose its plumb or to warp out of its proper position.

In industry in general, there are many instances in which two juxtaposed structural members must be adjusted in relation to each other to achieve a desired fit. It is the object of this invention to provide an adjustable connector assembly adapted to interconnect two such structural members to retain them in juxtaposed position, while being adjustable to position the two members as desired.

Particularly with respect to the building industry, and the installation of door frames in wall openings, it is necessary that a door frame be plumb even though the supporting wall members are not plumb. Accordingly, another object of the present invention is the provision of an adjustable connector assembly adapted to be mounted so as to interconnect the door frame with the supporting wall stud while permitting adjustability of the door frame member in relation to the supporting stud to achieve a desired position of the door frame in relation to the supporting stud member.

Another object of the invention is the provision of a special tool for applying the adjustable connector member.

Still another object of the invention is the provision of an article of manufacture in the form of a cylindrical, threaded, slotted connector member that may be easily applied to a conventional wood or metal screw to form an adjustable connector assembly for application in the manner previously discussed.

The invention possesses other objects and features of advantage, some of which, with the foregoing, will be apparent from the following description and the drawings. It is to be understood however that the invention is not limited to the embodiments illustrated and described, since it may be embodied in various forms within the scope of the appended claims.

SUMMARY OF THE INVENTION

In terms of broad inclusion, the adjustable connector assembly of the invention, in one aspect, comprises a tubular cylindrical first connector member threaded on its exterior periphery and provided with a bearing surface on its inner periphery and a plurality of radially extending slots across one end of the connector member. The tubular connector is journaled on a shank or journal portion of a second connector, the first and second connector members being rotatably related one to the other and locked against axial displacement with respect to each other by rotatable entrapment of the head of the second connector in a circumferential groove in the inner periphery of the first connector. The second connector is provided with a projecting shank portion that is provided with threads for threaded engagement with an associated structural member. In use, each of the connector members is suitably attached to associated juxtaposed structural members to secure those members together. Because the first and second connector members are freely rotatable in relation to each other, while being locked against axial displacement, rotation of the second connector member in relation to the first will effect relative movement between the juxtaposed structural members. In another aspect of the invention, instead of the first connector member being provided with a circumferential groove, the second connector member is provided with a circumferential groove adapted to receive a split spring ring which captures the first connector member between the split spring ring and the head of the second connector member to thus prevent relative axial displacement of the two connectors after assembly.

DESCRIPTION OF THE PREFERRED EMBODIMENT

Figure 1:
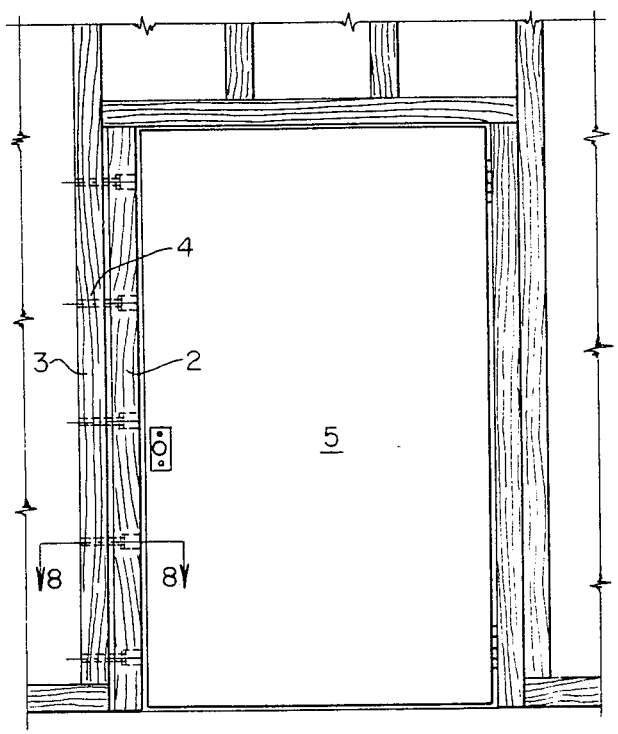
FIG. 1 is a fragmentary elevational view illustrating the adjustable connector assembly of the invention used in association with a door frame mounted in a wall opening.
Figure 8:
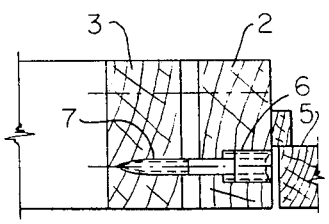
FIG. 8 is an enlarged fragmentary cross sectional view illustrating the adjustable connector assembly connecting two juxtaposed structural members.
Figure 2:
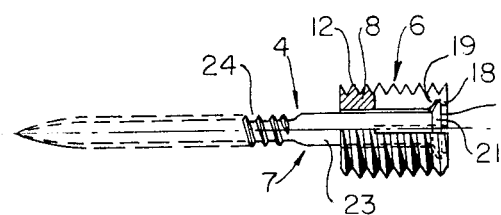
FIG. 2 is a side elevational view of the adjustable connector assembly, shown apart from the wall structure, a portion of the first connector member being shown in vertical cross-section to expose underlying parts.

In terms of greater detail, the adjustable connector assembly of the invention in its preferred form is illustrated in FIG. 2 and is shown in use in FIGS. 1 and 8. It is to be understood that while I have chosen to illustrate the adjustable connector assembly of the invention in conjunction with the interconnection of two juxtaposed wood structural members, the adjustable connector assembly may be fabricated for application to other types of materials, such as metal or plastic, without departing from the spirit of the invention.

Accordingly, as applied to mount a door frame member 2 in the wall opening of a wall, the wall opening being defined on one side by a vertical structural member 3, the adjustable connector assembly of the invention is designated generally by the numeral 4, while the door supported in the door opening is designated generally by the numeral 5.

Figure 9:
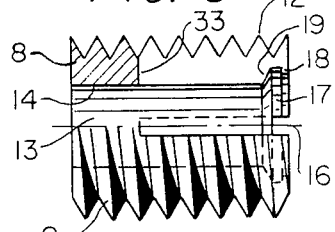
FIG. 9 is an enlarged elevational view, partly in vertical section, illustrating as an article of manufacture, a sleeve device which functions as the first connector member to form a connector assembly when applied to a conventional wood screw.
Figure 10:
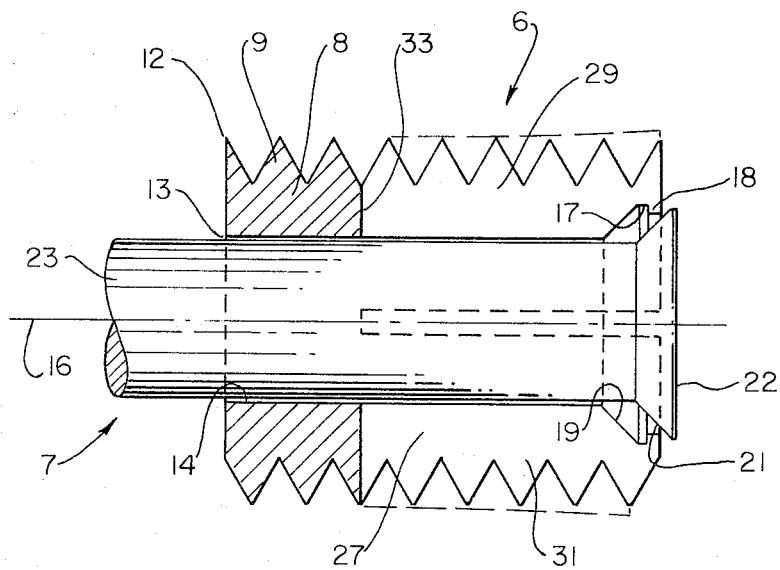
FIG. 10 is an enlarged fragmentary vertical cross-sectional view illustrating a partial assembly of the first and second connectors. The view also illustrates schematically in broken lines the manner in which the sleeve segments of the first connector spring outwardly to admit the head of the second connector into locking position.
Figure 11:
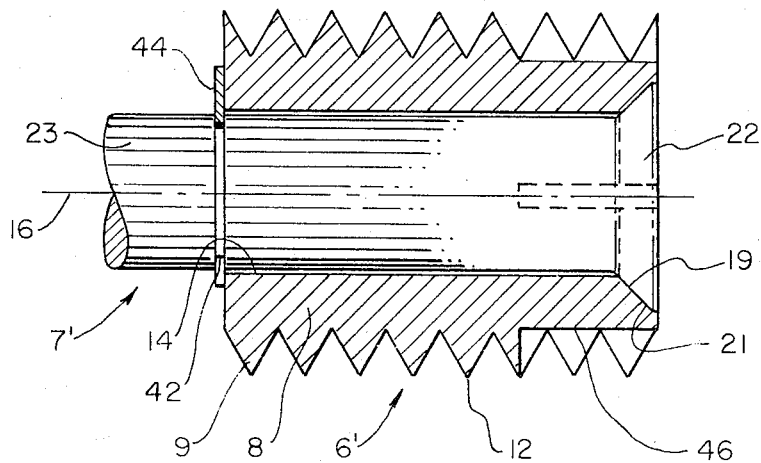
FIG. 11 is an enlarged fragmentary cross-sectional view similar to FIG. 10, but showing the embodiment of FIG. 4.

Referring to FIGS. 2, 3, 8, 9 and 10, the adjustable connector assembly comprises a first connector member designated generally by the numeral 6 and a second connector member designated generally by the numeral 7. The first connector member comprises an elongated generally cylindrical sleeve 8 having threads 9 on its exterior periphery 12, and having a central bore 13 defined by an inner peripheral surface 14 symmetrical with respect to the longitudinal axis 16 of the sleeve-like structure 6. As illustrated in FIGS. 9 and 10, the sleeve-like structure is provided adjacent one end with a radially extending circumferential groove or slot 17 defined on one side by a radially inwardly extending flange 18. On its opposite side the groove or slot is defined by an abutment surface 19 which, as illustrated in FIGS. 9 and 10, complements and accommodates the conically configured undersurface 21 of the second connector member 7.

As illustrated in FIG. 2, the conical undersurface 21 of the second connector 7 is formed on the underside of the head 22 of the second connector, the head being formed on one end of the shank 23. The other end portion of the second connector 7 is provided with screw threads 24 adapted to bite into an appropriately proportioned guide hole bored into the structural member and proportioned to receive the wood screw shank portion 24 in the conventional manner. It should also be noted that the screw threads 9 formed on the outer periphery 12 of the cylindrical connector member 6 are also adapted to engage in wood, and are provided with the same lead as the screw threads 24 formed on the second connector member 7. Thus, when the two members 6 and 7 are rotated simultaneously, and turned into appropriately dimensioned bores in the respective support members 2 and 3 as illustrated in FIG. 1, the connector members 6 and 7 advance into their respective support members 2 and 3 at the same rate. Thus, when fully driven, as illustrated in FIGS. 1 and 8, the two connector members 6 and 7, being locked against axial displacement in relation to each other, are effective to retain the two juxtaposed members 2 and 3 in relatively fixed position with respect to each other. Because of the freely rotatable relationship between the cylindrical sleeve-like first connector member 6 and the second connector member 7, after installation of the assembly, the second connector member 7 may be rotated in relation to the first connector member, either clockwise or counter-clockwise, while the first connector member 6 is retained against rotation by the frictional force imposed on the threaded interengagement between the threads 9 and the support structure 2. Thus, such rotation of the second connector member, either clockwise or counter-clockwise, will effect transverse movement of the support member 2 depending upon the direction of rotation of the second connector member.

This occurs because the head 22 of the second connector member is trapped or caught in the slot 17 formed in the first connector member, thus preventing its movement axially in relation to the first connector member. When the second connector member is rotated clockwise, for instance, thus driving deeper into the supporting member 3, the juxtaposed support member 2 in the form of the door frame will be pulled closer to the support member 3. On the other hand, if the second connector member 7 is rotated counter-clockwise, to thus cause movement of the second connector member to the right as viewed in FIG. 1, the effect will be that the head 22 of the second connector member will abut against the flange 18 of the second connector member, and thus move the supporting door frame 2 to the right with relation to the support member 3.

Figure 7:
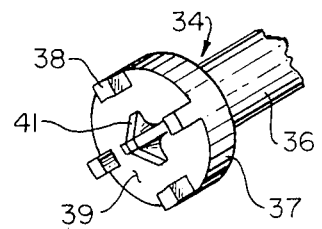
FIG. 7 is a fragmentary perspective view illustrating the operating head of a tool for installing the adjustable connector assembly of the invention.
Figure 3:
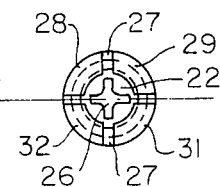
FIG. 3 is an end elevational view of the adjustable connector assembly illustrated in FIG. 2.

As discussed above, when the adjustable connector assembly is applied to the two juxtaposed support members 2 and 3, the tool illustrated in FIG. 7 is utilized. To accommodate the tool, which will be described in detail hereinafter, the adjustable connector assembly is designed to accept engagement by the tool to permit the installation of the adjustable connector assembly by simple rotation of the tool. To this end, the head 22 of the second connector member 7 is provided with a slot 26 adapted to receive a screwdriver to effect rotation of the second connector member 7 in the usual manner. The screwdriver may be a Phillips-head type, as illustrated, or other type as desired. Additionally, the end of the first connector member 6 adjacent the slot 17, is provided with longitudinally extending transverse slots 27, preferably four in number, which extend diametrically across the sleeve-like connector member 6, as illustrated in FIGS. 3 and 10, the slots 27, for the extent of their length, forming a discontinuity in the peripheral wall of the sleeve, thus dividing the associated end of the sleeve into a plurality of segments 28, 29, 31 and 32 which extend longitudinally along the longitudinal dimension of the sleeve-like connector member 6, the length of the segments being determined by bottom 33 of slots 27 as shown best in FIGS. 9 and 10, thus enabling each of the segments to be resiliently displaced outwardly when the second connector member 7 is inserted through the bore 13 so as to capture or trap the head 22 thereof in the groove or slot 17 of the surrounding first connector member 6. As seen in FIG. 10, the conical undersurface 21 of the screwhead 22 engages the edge of flange 18 on each of the segments 28, 29, 31 and 32 and cams the segments outwardly as shown by the broken lines in FIG. 10.

Thus, the slots 27 and the screwdriver slot 26 may be engaged by complimentary parts of the tool illustrated in FIG. 7 and designated generally by the numeral 34. The tool, as illustrated in FIG. 7, is provided with a drive shank 36 and a head 37, the head being provided with axially extending lugs 38, preferably four in number, and disposed diametrically from each other across the face 39 of the tool, the face 39 of the tool also having projecting therefrom and centrally disposed in relation thereto, a Phillips screwdriver head 41. Thus, when the tool 34 is applied to the adjustable connector assembly 4, the lugs 38 engage the slots 27, and the Phillips screwdriver head 41 engages the screwdriver slot 26. Thus, upon rotation, the tool 34 simultaneously drives the first and second connector members of the adjustable connector assembly. Subsequently, to effect adjustability of the door frame member 2, the second connector member is rotated by application of a conventional screwdriver to the screwdriver slot 26.

Figures 4, 5, 6:
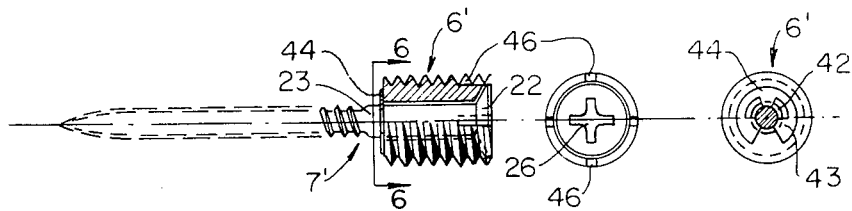
FIG. 4 is a side elevational view of a different embodiment of the adjustable connector assembly of the invention.
FIG. 5 is an end elevational view of the adjustable connector assembly illustrated in FIG. 4.
FIG. 6 is a vertical cross-sectional view taken in the plane indicated by the line 6—6 of FIG. 4.

In the embodiment of the invention illustrated in FIGS. 4, 5, 6 and 11, the structure has been modified to eliminate the groove or slot 17 in the cylindrical connector member 6, and in lieu thereof, the shank 23 of the second connector member has been provided with a circumferential groove 42 adapted to receive the tines 43 of a split spring ring member 44 as illustrated in FIG. 6. As before, the cylindrical sleeve-like first connector member 6' is provided with diametrically opposed and longitudinally extending slots 46, but the slots do not extend completely through the body of the sleeve for the reason that the sleeve 6' is not formed with separated segments as defined by the slots 27 in FIG. 9, and are not required to spring outwardly to accommodate the maximum diameter dimension of the screw head 22 as previously discussed. Thus, in this embodiment, the screw head 21 merely seats in the chamfered end of the threaded sleeve 6' and as before, the tool illustrated in FIG. 7 may be utilized to simultaneously drive the first connector member 6' and the second connector member 7' as previously discussed, thus achieving simultaneous placement of the first and second connectors to adjustably interconnect the two juxtaposed structural members 2 and 3. The first and second connector members 6' and 7', respectively, are prevented from axial displacement in relation to each other by the split spring ring 44, which abuts one end of the first connector member as illustrated, while the tines 43 engage the slot 42 formed in the second connector member, thus retaining the first connector member 6' rotatably trapped between the split spring ring 44 and the head 22 of the second connector member. Thus, to effect positional adjustment of the two support structures 2 and 3, relative to each other, all that is again required is that a screwdriver be used to rotate the second connector member 7' either clockwise or counter-clockwise, depending upon the direction of adjustment desired. When turned counter-clockwise the split spring ring abuts the associated end of the sleeve 6', while rotation of the second connector clockwise brings the head 22 into bearing abutment with the bearing surface on the sleeve 6'.

Having thus described the invention, what is believed to be new and novel and sought to be protected by letters patent of the United States is as follows:

I claim:

1. An adjustable connector assembly for connecting and selectively adjusting the relative positions of two juxtaposed members secured to each other by the adjustable connector assembly comprising:

(a) a first connector element adapted to be secured to one of said two juxtaposed members;
   (b) a second connector element including a first portion rotatably mounted in said first connector element and locked against axial displacement in relation thereto and a second portion adapted to be secured to the other of said two juxtaposed members, whereby rotation of said second connector element in one direction in relation to said first connector element effects relative movement of said two juxtaposed members away from each other while rotation of the second connector element in the opposite direction in relation to the first connector element effects relative movement of the two juxtaposed members toward each other;
   (c) said first connector element comprising a tubular sleeve symmetrical about a longitudinal axis and having inner and outer peripheries, said outer periphery having screw threads adapted to engage one of said two juxtaposed members, said second portion of said second connector element having screw threads adapted to engage the other of said two juxtaposed members;
   (d) said inner periphery of said tubular sleeve being provided with a radially extending circumferential slot, and said second connector element comprises an elongated body journaled for rotation in said first connector element and includes a head engaging said circumferential slot, whereby after assembly said second connector element is precluded from axial displacement in relation to said tubular sleeve; and
   (e) said first connector element including an inner peripheral surface forming a journal bearing for the first portion of said second connector element, a relative larger diameter inner peripheral cylindrical surface next adjacent one end thereof, and a generally conical inner peripheral surface disposed adjacent said circumferential slot and constituting a bearing surface complimentary in configuration to the head of said second connector element.

2. An adjustable connector assembly for use in connecting and selectively adjusting the relative positions of two juxtaposed members which are secured to each other by said adjustable connector assembly, said adjustable connector assembly comprising:

a tubular sleeve symmetrical about a central longitudinal bore and having inner and outer peripheral surfaces, said outer peripheral surface having screw threads adapted to engage a first one of said juxtaposed members;
   longitudinally extending slot means formed in a first end of said sleeve and extending through said sleeve between said inner and outer peripheral surfaces;
   a circumferential, radially outwardly extending slot in said inner peripheral surface of said sleeve adjacent a first end of said sleeve;
   an abutment surface on said inner peripheral surface of said sleeve adjacent said circumferential slot and extending along said inner peripheral surface towards a second end of said tubular sleeve; and
   a screw-type connector rotatably carried by said central bore of said tubular sleeve and having a head at a first end of a shank and a threaded portion at a second end of said shank, said threaded portion of said shank extending beyond said second end of said tubular sleeve and being adapted to engage a second one of said juxtaposed members, said head of said screw-type connector bearing against said abutment surface and engaging said circumferential slot to restrain said screw-type connector from axial movement in said bore whereby rotation of said screw-type connector in a first direction with respect to said tubular sleeve effects relative movement of said two juxtaposed members toward each other while rotation of said screw type connector in a second direction with respect to said tubular sleeve effects relative movement of said two juxtaposed members away from each other.

3. A connector element for use with a screw-type connector member having a head at a first end of a shank and a threaded portion at a second end of the shank, said connector element comprising:

a tubular sleeve symmetrical about a central longitudinal bore which is sized to rotatably carry the shank of the screw-type connector element, said tubular sleeve having an outer peripheral surface and an inner peripheral surface;

screw threads formed on said outer peripheral surface of said tubular sleeve;

a recess formed in said inner peripheral surface adjacent a first end of said tubular sleeve and adapted to receive the head of the screw-type connector member;

longitudinally extending slot means formed in a first end of said tubular sleeve and extending through said sleeve between said inner and outer peripheral surfaces;

a circumferential, radially outwardly extending slot in said inner peripheral surface of said sleeve at an end of said recess adjacent said first end of said sleeve; and a radially inwardly extending flange interposed between said circumferential slot and said first end of said sleeve whereby the head of the screw-type connector is receivable in said recess and is restrained by said circumferential slot to preclude axial movement of the shank of the screw-type connector in said central longitudinal bore of said tubular sleeve.

4. The adjustable connector assembly of claim 2 wherein said longitudinally extending slot means comprises a plurality of slots evenly spaced about said sleeve.

5. The connector element of claim 3 wherein said longitudinally extending slot means comprises a plurality of slots evenly spaced about said sleeve.

6. The connector element of claim 3 wherein said recess is generally conical and tapers radially inwardly toward said central longitudinal bore in the direction of a second end of said sleeve.

* * * * *